United States Patent
Cattoor et al.

(10) Patent No.: US 11,560,942 B2
(45) Date of Patent: Jan. 24, 2023

(54) TORQUE CONVERTER WITH LOCK-UP CLUTCH AND TORQUE CONVERTER OPERATING METHOD

(71) Applicant: Dana Belgium N.V., Bruges (BE)

(72) Inventors: Kurt Cattoor, Koolkerke (BE); Filip D. Schacht, Muelebeke (BE); Tommy Van Acker, Lievegem (BE); Joachim Van Dingenen, Drongen (BE)

(73) Assignee: Dana Belgium N.V., Bruges (BE)

( * ) Notice: Subject to any disclaimer, the term of this patent is extended or adjusted under 35 U.S.C. 154(b) by 0 days.

(21) Appl. No.: 17/327,484

(22) Filed: May 21, 2021

(65) Prior Publication Data

US 2022/0373070 A1    Nov. 24, 2022

(51) Int. Cl.
*F16H 45/02* (2006.01)

(52) U.S. Cl.
CPC ....... *F16H 45/02* (2013.01); *F16H 2045/021* (2013.01); *F16H 2045/0221* (2013.01); *F16H 2045/0284* (2013.01)

(58) Field of Classification Search
CPC .............. F16H 2045/0284; F16D 25/0638
See application file for complete search history.

(56) References Cited

U.S. PATENT DOCUMENTS

| | | | |
|---|---|---|---|
| 3,537,556 A | 11/1970 | Pfeffer et al. | |
| 4,071,125 A | 1/1978 | Jameson | |
| 4,548,306 A | 10/1985 | Hartz | |
| 4,867,290 A * | 9/1989 | Macdonald | F16F 15/129 192/203 |
| 5,137,131 A | 8/1992 | Enomoto | |
| 5,960,923 A | 10/1999 | Araki | |
| 6,343,679 B1 * | 2/2002 | Kundermann | F16H 45/02 192/3.3 |
| 6,814,202 B1 * | 11/2004 | Johann | F16H 41/24 192/113.32 |
| 6,991,078 B2 * | 1/2006 | Leber | F16H 45/02 192/106 F |
| 7,028,820 B2 * | 4/2006 | Johann | F16H 45/02 192/3.3 |
| 7,527,135 B2 * | 5/2009 | Ito | F16D 25/12 192/85.42 |
| 9,732,807 B1 | 8/2017 | Logan et al. | |

(Continued)

FOREIGN PATENT DOCUMENTS

| | | | | |
|---|---|---|---|---|
| CN | 111765178 A | * | 10/2020 | |
| DE | 102012203588 A1 | * | 9/2013 | F16D 25/0638 |

*Primary Examiner* — Ernesto A Suarez
*Assistant Examiner* — James J Taylor, II
(74) *Attorney, Agent, or Firm* — McCoy Russell LLP

(57) ABSTRACT

Torque converter arrangements and operating methods are provided herein. In one example, the torque converter includes a first attachment interface designed to rotationally couple to a prime mover and a second attachment interface designed to rotationally couple to a transmission. The torque converter further includes a lock-up clutch with an engagement spring embedded in an actuation piston, a plurality of separator plates supported by one or more guiding pins that extend through the plurality of separator plates and into a casing, and a plurality of friction plates interleaved with the plurality of separator plates, where the plurality of separator plates and friction plates are axially captured between the actuation piston and an end plate.

20 Claims, 5 Drawing Sheets

(56) References Cited

U.S. PATENT DOCUMENTS

| | | | |
|---|---|---|---|
| 10,233,978 B2 * | 3/2019 | Matsuda | F16D 13/583 |
| 10,464,410 B2 * | 11/2019 | Lahr | F16F 15/1213 |
| 2002/0175037 A1 | 11/2002 | Wack et al. | |
| 2005/0061602 A1 | 3/2005 | Yi | |
| 2013/0015032 A1 | 1/2013 | Mangiagli et al. | |
| 2014/0367214 A1 | 12/2014 | Lunati et al. | |
| 2017/0343092 A1 | 11/2017 | Arhab et al. | |

\* cited by examiner

TORQUE CONVERTER WITH LOCK-UP CLUTCH AND TORQUE CONVERTER OPERATING METHOD

TECHNICAL FIELD

The present disclosure relates to a torque converter with a lock-up clutch in a powertrain system and a method for operation of the torque converter.

BACKGROUND AND SUMMARY

Certain powertrains include hydraulic torque converters. Typically, in-use, the torque converters are coupled directly to an engine and transmission. Torque converters have a comparatively high input speed, low output speed, and torque multiplication functionality. Hence, torque converters are particularly useful during vehicle launch and pushing operations. However, after a certain amount of acceleration, the converter's output speed may approach the input speed which reduces the torque multiplication while efficiency losses in the converter persist. At a certain operating point, the converter's torque multiplication functionality becomes negligible. In certain torque converters, at this point, a lock-up clutch may be used to lock rotation of the driving and driven wheel of the converter. Because of lock-up clutch engagement, the engine is directly coupled to the transmission which reduces torque converter losses.

US 2017/0343092 A1 to Arhab et al. teaches a hydrokinetic torque coupling device that has a lock-up clutch integrated therein. Arhab's lock-up clutch, when closed, locks the rotation of the casing to a turbine, such that the driven and drive shafts of the torque coupling device rotate in unison.

The inventors have recognized several drawbacks with Arhab's torque coupling device as well as other torque converters. For instance, Arhab's torque converter and other torque converters are stiff and generate undesirable amounts of noise, vibration, and harshness (NVH) during shifting transients. The inventors have therefore recognized that the system's lack of flexibility may diminish shifting performance.

To address at least a portion of the abovementioned issues, the inventors developed a torque converter. The torque converter includes a first attachment interface designed to rotationally couple to a prime mover. The torque converter further includes a second attachment interface designed to rotationally couple to a transmission. Even further, the torque converter includes a lock-up clutch with an engagement spring embedded in an actuation piston. The lock-up clutch has a plurality of separator plates supported by one or more guiding pins that extend through the plurality of separator plates and into a casing and a plurality of friction plates interleaved with the plurality of separator plates. In the lock-up clutch, the plurality of separator plates and friction plates are axially captured between the actuation piston and an end plate. Due to the incorporation of the engagement spring into the lock-up clutch, the system's controllability, shifting performance, and shifting quality is increased due to the spring attenuating shocks that occur during shifting events. The abovementioned torque converter may additionally have greater space efficiency than previous torque converter.

Further, in one example, the one or more guiding pins may each extend axially through a corresponding opening in one of the plurality of clutch separator plates and into a recess in a section of the casing. Further, in certain examples, the engagement spring may be positioned radially inward from the one or more guiding pins. In this way, the lock-up clutch may achieve a compact and easy to assemble design, thereby reducing manufacturing duration and costs, if wanted.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2-3 and 5 are drawn approximately to scale. However, other relative component dimensions may be used, in alternate embodiments.

DETAILED DESCRIPTION

A space efficient torque converter which provides enhanced shifting performance (e.g., shift quality and controllability) is described herein. The torque converter includes a spring enclosed within a lock-up clutch's control piston. The torque converter further includes guide pins that mate with openings in separator plates, thereby supporting the plates during clutch engagement. Due to the guide pin and separator plate arrangement, splines attaching the separator plates to a torque converter casing may be forgone, if wanted. This results in a more compact arrangement with less complexity and parts that are easier to manufacture and assemble when compared to a clutch utilizing plate splines that mate with the casing for support, for example. The spring in the control piston interacts with friction plates in the clutch to attenuate shocks that occur during shifting transients. Shifting performance (e.g., shifting controllability and quality) is enhanced, as a result. Specifically, noise, vibration, and harshness (NVH) during clutch engagement may be reduced when the system uses a spring in the control piston.

Figure 1:
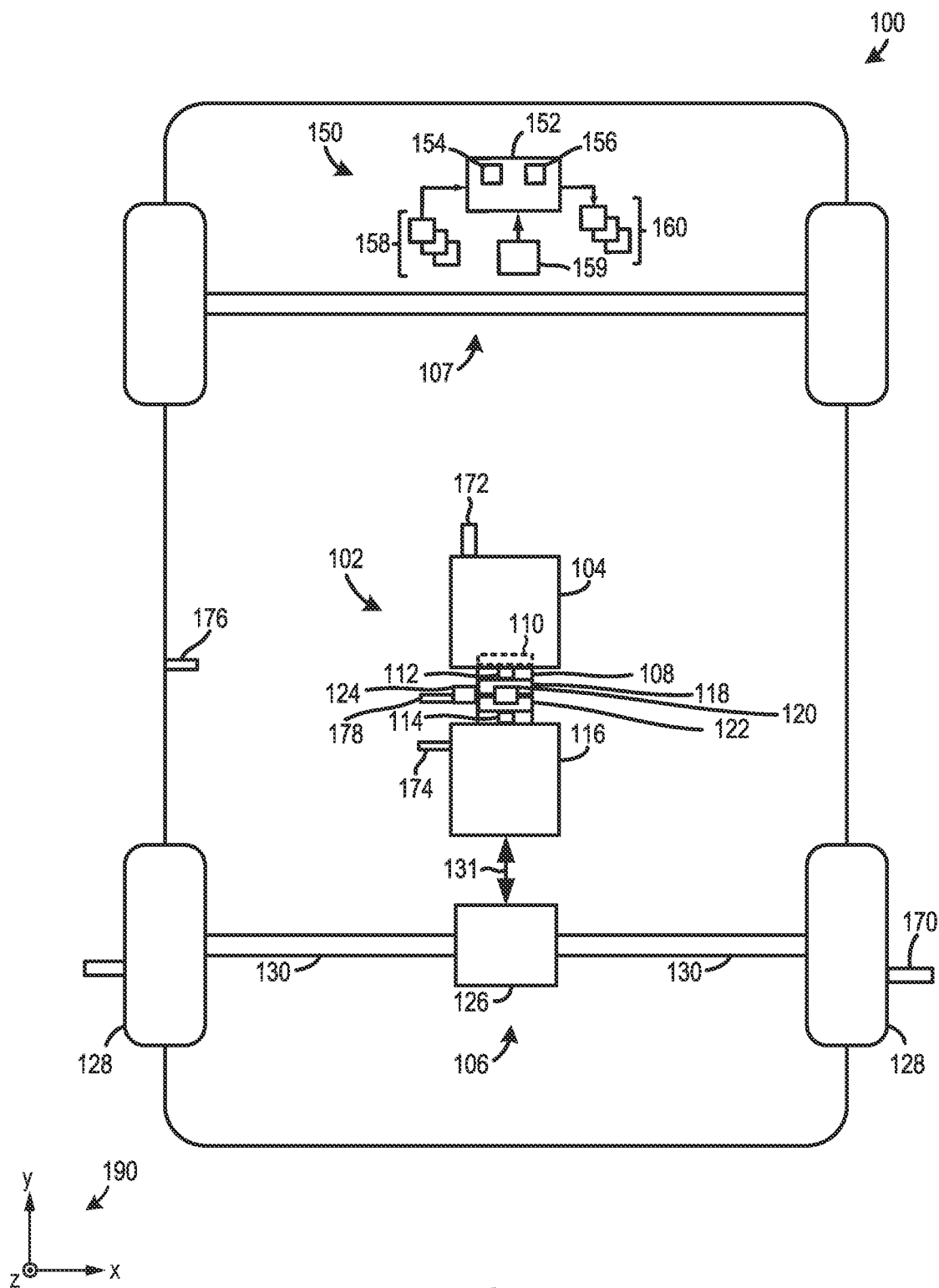
FIG. 1 is a schematic representation of a vehicle with a hydraulic torque converter.

FIG. 1 shows a schematic depiction of a vehicle 100 with a powertrain 102 that includes a prime mover 104 (e.g., an internal combustion engine (ICE) designed for compression and/or spark ignition, an electric motor, combinations thereof, and the like). As such, the vehicle may be an ICE vehicle that omits an electric motor, in one example, or alternatively, may be an electric vehicle (EV) which forgoes the engine. Still further, in other examples, the vehicle may be a hybrid vehicle that includes both a motor and internal combustion engine. The vehicle 100 may include a drive axle 106 and a non-drive axle 107, although numerous axle arrangements have been envisioned.

The powertrain 102 may further include a torque converter 108 that is rotationally coupled to the prime mover 104. A flexplate 110 may be used to form the rotational attachment between the prime mover 104 and the torque converter 108. Alternatively, a flange connection may be used to attach the prime mover 104 to the torque converter 108. The torque converter 108 includes an input interface 112 and an output interface 114 that serve as attachment points for the prime mover 104 and a transmission 116, respectively. The interfaces in the torque converter may be any suitable attachment mechanism such as plates, shafts, flanges, combinations thereof, etc.

The torque converter 108 serves as a hydraulic coupling for power transfer between the prime mover 104 and the transmission 116 or vice versa. Specifically, the torque converter may increase output torque during certain conditions. The torque converter 108 may include an impeller 118, stator 120, turbine 122, and the like to achieve the aforementioned torque gains. The torque converter 108 includes a lock-up clutch 124 designed to engage and disengage based on powertrain operating conditions. When engaged, the lock-up clutch holds the input and output of the torque converter at an equivalent rotational speed. Conversely, when disengaged, the lock-up clutch does not lock the input and output together and instead permits the torque converter to operate as a torque multiplier. The torque converter 108 is schematically illustrated in FIG. 1. Nevertheless, the torque converter has greater structural complexity that is described with regard to the torque converter embodiments illustrated in FIGS. 2-3 and 5.

The transmission 116 may be a powersplit, powershift, or hydrostatic type transmission, in different examples. The powershift transmission may be a transmission with friction clutches that are coordinated to reduce power losses during shifting transients. The powersplit transmission may be a transmission in which a mechanical branch and an electrical branch are coupled in parallel. The hydrostatic transmission may be a transmission with a hydraulic pump coupled to a hydraulic motor that jointly function to provide speed-torque conversion. The powertrain 102 may further include a differential 126 the is rotationally coupled to the transmission 116. The differential may also be connected to drive wheels 128 via axle shafts 130. Arrows 131 depict the power flow between the transmission 116 and the differential 126, during different operating conditions.

A control system 150 with a controller 152 may further be incorporated in the powertrain 102. The controller 152 includes a processor 154 and memory 156. The memory 156 may hold instructions stored therein that when executed by the processor cause the controller 152 to perform the various methods, control strategies, etc., described herein. The processor 154 may include a microprocessor unit and/or other types of circuits. The memory 156 may include known data storage mediums such as random access memory, read only memory, keep alive memory, combinations thereof, etc. The components of the controller may be collocated, in one example, or dispersed between multiple controller units, in alternate examples.

The controller 152 may receive vehicle data and various signals from sensors 158 positioned in different locations in the powertrain 102 and/or the vehicle 100. The sensors may include wheel speed sensors 170, a prime mover speed sensor 172, a transmission input speed sensor 174, an ambient temperature sensor 176, a lock-up clutch position sensor 178, and the like.

Further, the controller 152 may send commands to actuators 160 for component adjustment. For instance, the controller 152 may send control signals to an actuator of the lock-up clutch 124. For example, when the lock-up clutch is hydraulically actuated, the controller may send commands to a hydraulic actuator (e.g., hydraulic valve) in fluidic communication with the lock-up clutch 124. Responsive to receiving the command, the actuator may engage or disengage the lock-up clutch. The controller may further send control signals to the prime mover 104 to adjust the output speed. Still further, the controller may send signals to one or more actuators in the transmission that, in response, initiate a shift event to adjust the gear ratio. The shift signals may be automatically generated and therefore the transmission may be formed as an automatic transmission which automatically transitions between discrete gear ratios based on engine speed and load, for instance.

The control system 150 may include an input device 159 (e.g., an accelerator pedal, brake pedal, a control-stick, levers, buttons, combinations thereof, and the like). For instance, the input device 159 may allow the operator to generate a power request, a drive mode request in the case of an automatic transmission, a brake request, and the like.

Figure 2:
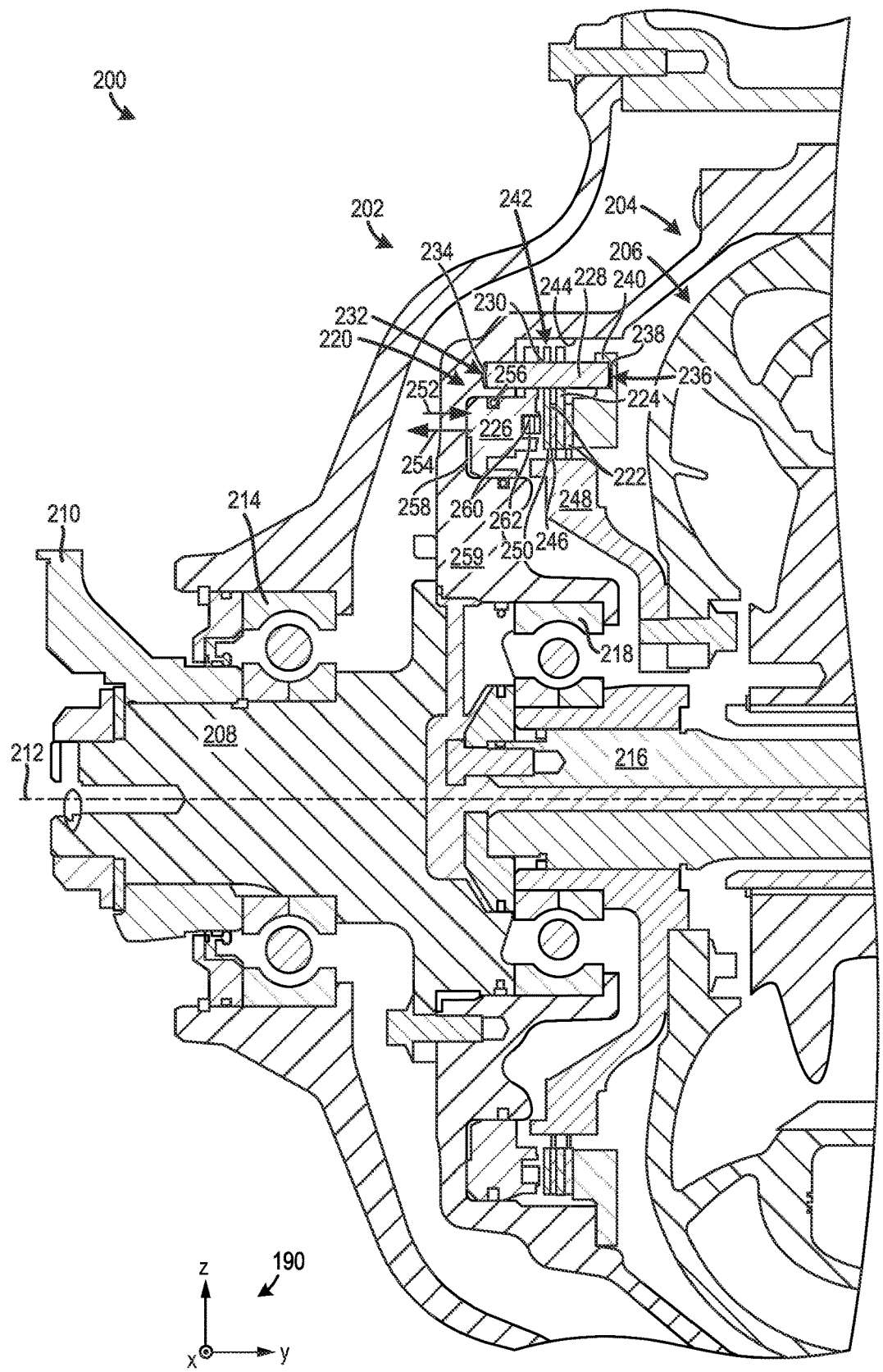
FIG. 2 depicts, in cross-section, a first embodiment of a hydraulic torque converter with a lock-up clutch.
Figure 3:
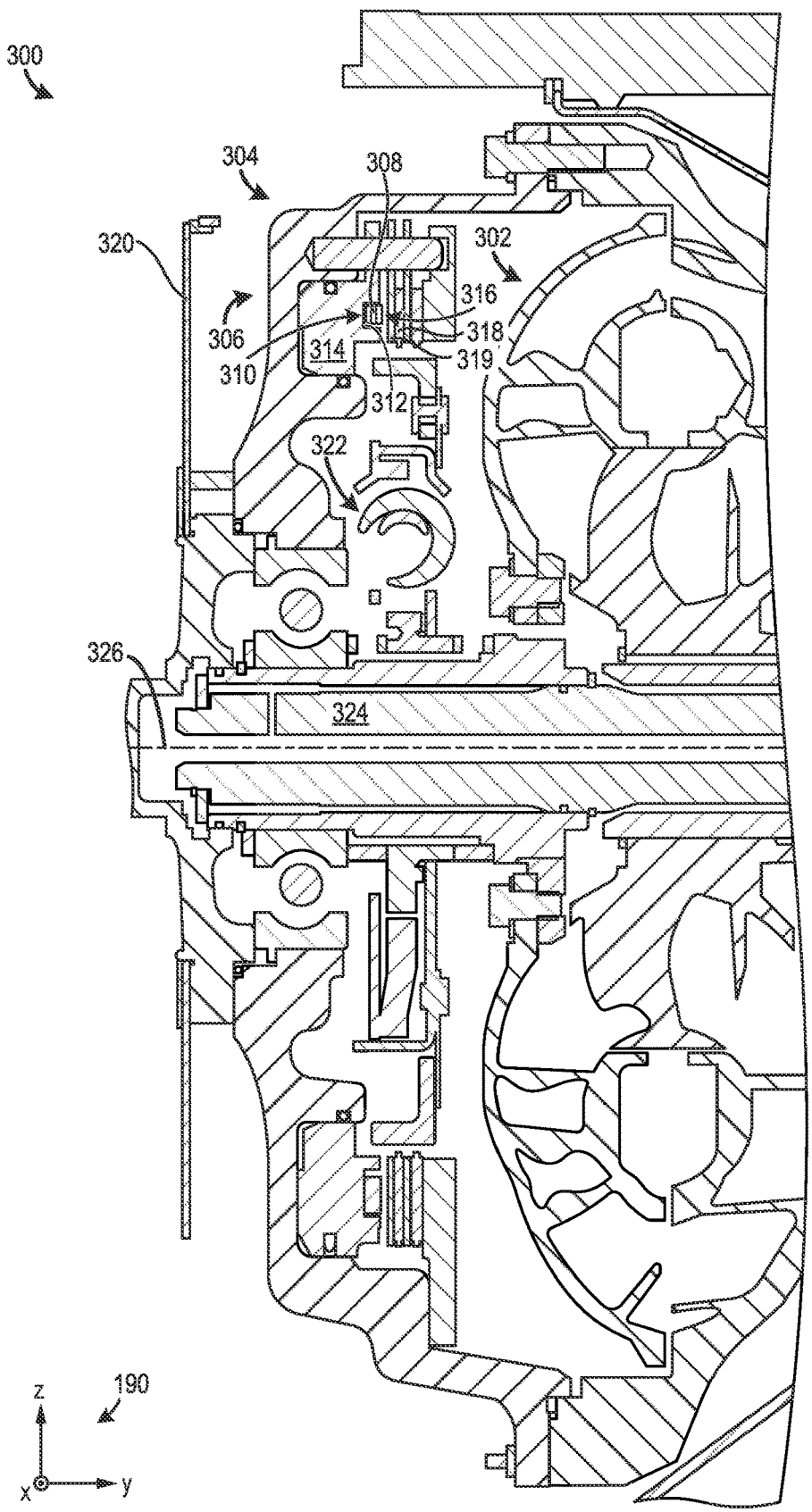
FIG. 3 depicts, in cross-section, a second embodiment of a hydraulic torque converter with a lock-up clutch and a hydraulic damper.
Figure 5:
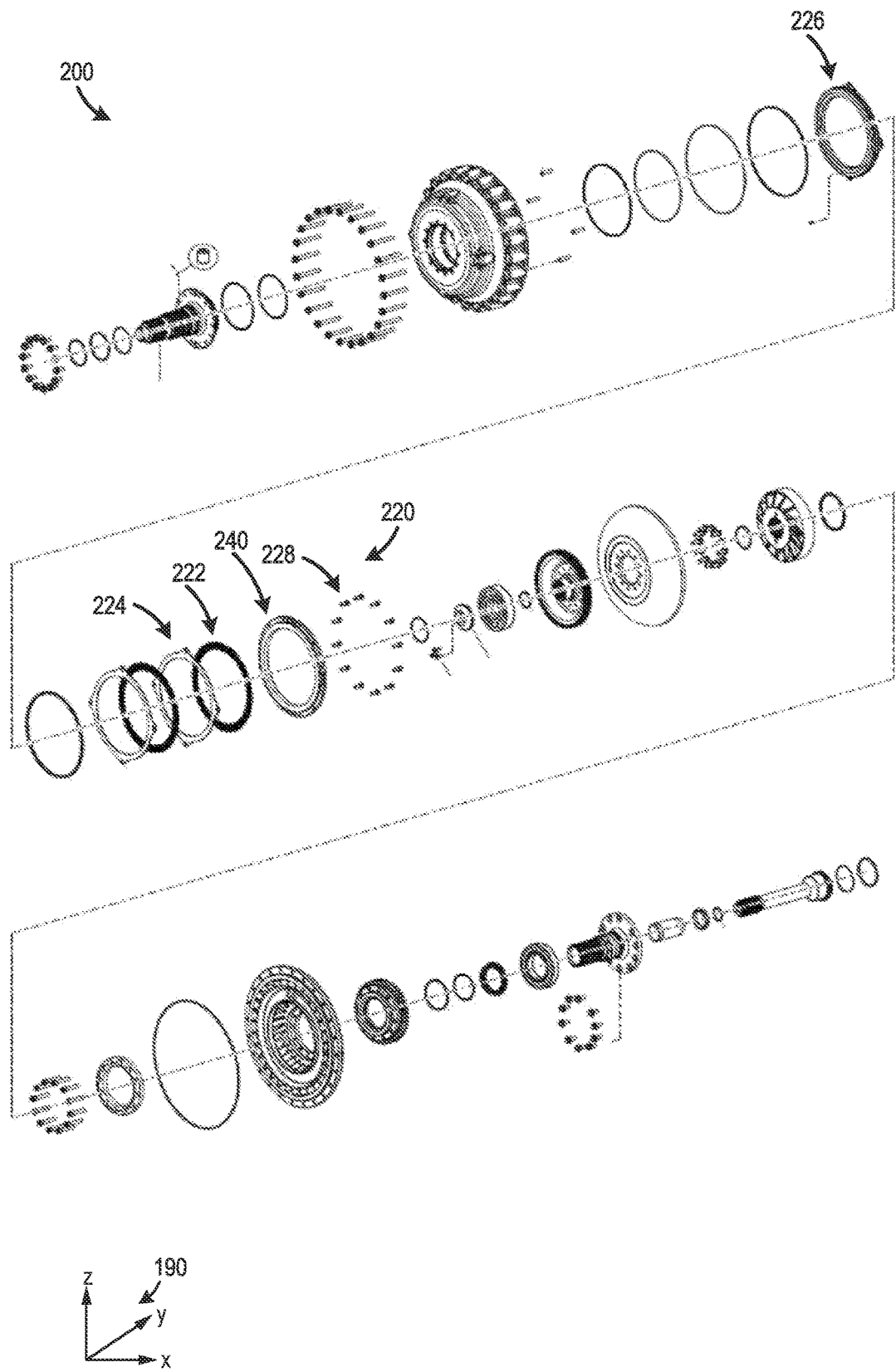
FIG. 5 depicts an exploded view of the first embodiment of the hydraulic torque converter, depicted in FIG. 2.

An axis system 190 is provided in FIG. 1, as well as FIGS. 2, 3, and 5, for reference. The y-axis may be a vertical axis (e.g., parallel to a gravitational axis), the z-axis may be a lateral axis (e.g., a horizontal axis), and/or the x-axis may be a longitudinal axis, in one example. However, the axes may have other orientations, in other examples.

Turning to FIG. 2, a first embodiment of a torque converter 200 is illustrated. The torque converter 200, as well as the other torque converter embodiments described herein may be included in the powertrain 102 shown in FIG. 1. As such, the functional and/or structural features of the torque converter 108, shown in FIG. 1, may overlap with the features of the torque converter 200, shown in FIG. 2, and/or the other torque converters described herein or vice versa. Redundant description is therefore omitted for concision.

The torque converter 200 includes a housing 202, a casing 204, and a turbine 206. The casing 204 may be coupled to an impeller. An input shaft 208 with a flange 210 may function as the mechanical connection between the torque converter 200 and a prime mover (e.g., the prime mover 104, illustrated in FIG. 1). A central axis 212 about which the shaft rotates, as well as the other rotational components in the torque converter, is provided for reference. Continuing with FIG. 2, a bearing 214 (e.g., ball bearing, roller bearing, and the like) may be coupled to the input shaft 208 and the housing 202. The bearing 214 supports and permits rotation of the input shaft 208. As described herein, a bearing may include components such as roller elements, inner races, outer races, and the like to permit the bearing to constrain rotation of the component to which it is attached and provide support thereto. The torque converter 200 may include additional components such as a stator and an output interface (e.g., output shaft) that attaches to a transmission, as previously discussed.

The torque converter 200 may further include a central shaft 216 that may be coupled to the turbine 206. A bearing 218 may be coupled to the central shaft 216 and the casing 204. In this way, the case may rotate independently from the central shaft 216, during certain operating conditions.

A lock-up clutch 220 is further included in the torque converter 200. The lock-up clutch 220 may be a wet clutch, in one example. However, the lock-up clutch described herein may also be used in dry conditions. As such, the lock-up clutch may be a dry clutch, in alternate examples. The lock-up clutch 220 includes friction plates 222, separator plates 224, and an actuation piston 226. To increase the torque capacity of the lock-up clutch and scale the system, extra friction plates (e.g., discs) may be added to the clutch. The actuation piston 226 may be hydraulically actuated via hydraulic conduits routed thereto, in one example. However, in another example, the piston may be actuated using a solenoid.

Guiding pins 228 may further be provided in the lock-up clutch 220. The pins 228 extend through openings 230 in the separator plates 224. Further, the pins, at a first end 232, mate with a recess 234 in the casing 204, and at a second end 236, mate with a recess 238 in an end plate 240. In this way, the pins may be compactly incorporated into the lock-up clutch. The pins function to guide and support the separator plates 224 as the clutch engages and disengages. As such, the openings 230 in the separator plates 224 have a similar contour to the guiding pins 228. For instance, the pins may be cylindrical and the openings in the plates may therefore be rounded and have diameters that are larger than the pins. However, other pin and opening profiles, may be used, in other examples. Using the pins may enable the clutch to omit splines in the separator plates. As such, in one embodiment, the plurality of separator plates may not include splines that attach the casing to the plurality of plates. In such an example, outer radial ends 242 of the separator plates 224 may be spaced away from an interior surface 244 of the casing. In this way, clutch assembly may be simplified.

The friction plates 222 may include inner radial ends 246 that are coupled to a section 248 of the turbine 206. For instance, splines are other suitable attachment techniques may be used to couple the inner sides of the friction plates to the turbine section 248. Further, inner radial sides 250 of the separator plates 224 may be spaced away from the section 248 of the turbine 206. However, other plate configurations have been contemplated. Further, one of the friction plates 222 may be adjacent to the actuation piston 226 and one of the friction plates may be adjacent to the end plate 240. In other words, the end plate and the piston may axially capture the plates. In this way, the plates may be engaged and disengaged via piston movement.

The actuation piston 226 may be hydraulically actuated to engage and disengage the lock-up clutch. During engagement, the piston 226 moves axially in direction 252 to compress the friction plates 222 and the separator plates 224. Once enough frictional engagement between the plates is achieved, the turbine 206 rotates in unison with the casing 204. Thus, when the clutch 220 is engaged, the input and output of the torque converter are rotationally locked. Conversely, during disengagement, the piston 226 moves axially in direction 254 such that the plates frictionally disengage and the input and output of the torque converter rotationally unlock. As such, when the lock-up clutch is disengaged, the torque converter is permitted to act as a torque multiplier. Further, a seal 256 may be provided around the actuation piston 226 to enable pressurized fluid (e.g., oil) to flow into the cavity 258 and actuate the piston. However, alternate piston configurations have been envisioned. The cavity 258 may be included in a lock-up hub 259 which is connected to the casing 204. Further, the lock-up hub may be coupled to the bearing 218.

An engagement spring 260 (e.g., a wave spring or a disc spring) is embedded in an opening 262 in the actuation piston 226. The opening 262 may circumferentially surround a radial periphery of the spring 260. The disc spring may include one or more spring units (e.g., Belleville washers) while the wave spring may include a coiled flat wire with waves. Using a wave spring provides space efficiency gains when compared to a coil spring. Further, the use of a disc spring may be particularly effective when the clutch has high engagement force.

The engagement spring 260 may be axially arranged with regard to a central axis of the spring. As such, the spring's central axis may be parallel to the rotational axis 212 of the central shaft 216. A first axial end of the engagement spring 260 may be adjacent to (e.g., in face sharing contact with) an interior wall of the opening 262 and a second axial end of the spring may be adjacent to (e.g., in face sharing contact with) one of the friction plates. Arranging the engagement spring 260 in this manner permits the engagement spring to provide damping functionality during clutch engagement and disengagement. The engagement spring 260 may be positioned radially inward from the guiding pins 228 to increase clutch compactness.

When applying pressure, the engagement spring 260 in the lock-up clutch 220 acts as a flexible component that attenuates (e.g., prevents) shocks during engagement. Specifically, the engagement spring is activating the torque transfer before the piston 226 pushes on the plates 222, 224. As such, the engagement spring may reduce the reliance on predicting the clutch's touch point during actuation with high accuracy. In other words, the spring allows for less sensitivity during shifting transients. Consequently, transmission shift quality and comfort may be enhanced. The clutch's touch point is the point at which the piston starts to compress the wet clutch plates (e.g., discs) and at which torque is being transferred.

FIG. 5 depicts an exploded view of the torque converter 200. The lock-up clutch 220 with the guiding pins 228, separator plates 224, the friction plates 222, end plate 240, and actuation piston 226 are further illustrated.

FIG. 3 shows a second embodiment of a torque converter 300. The torque converter 300 again includes a turbine 302, casing 304, and lock-up clutch 306. An engagement spring 308 with a first axial end 310 adjacent to a wall 312 of an opening in the piston 314 and a second axial end 316 adjacent to one of the friction plates 318 and/or spacer plates 319, is further shown in FIG. 3. These components may have a similar structure and function to the corresponding components of the torque converter 200, depicted in FIG. 2. Therefore, redundant description is omitted for brevity.

An input interface 320 (e.g., flexplate) is further included in the torque converter 300. A torsional damper 322 may further be included in the torque converter 300. The torsional damper 322 is designed to reduce vibrations transferred from the engine to the transmission. The torsional damper 322 may include springs, plates, etc., to achieve the vibration dampening functionality. To increase torque converter compactness, the torsional damper may be positioned between the actuation piston 314 of the lock-up clutch 306 and a central shaft 324. Specifically, the damper 322 may be connected between the turbine shaft and the lock-up hub. The torsional damper allows vibrations from the engine which are passed through the transmission to diminished (e.g., avoided). The friction plates 318 may include splines connected to the lock-up hub, the hub may be connected to the torsional damper, and the damper may be connected to the input shaft 324. However, alternate torsional damper positions have been contemplated. A rotational axis 326 of the central shaft 324 is provided for reference.

Figure 4:
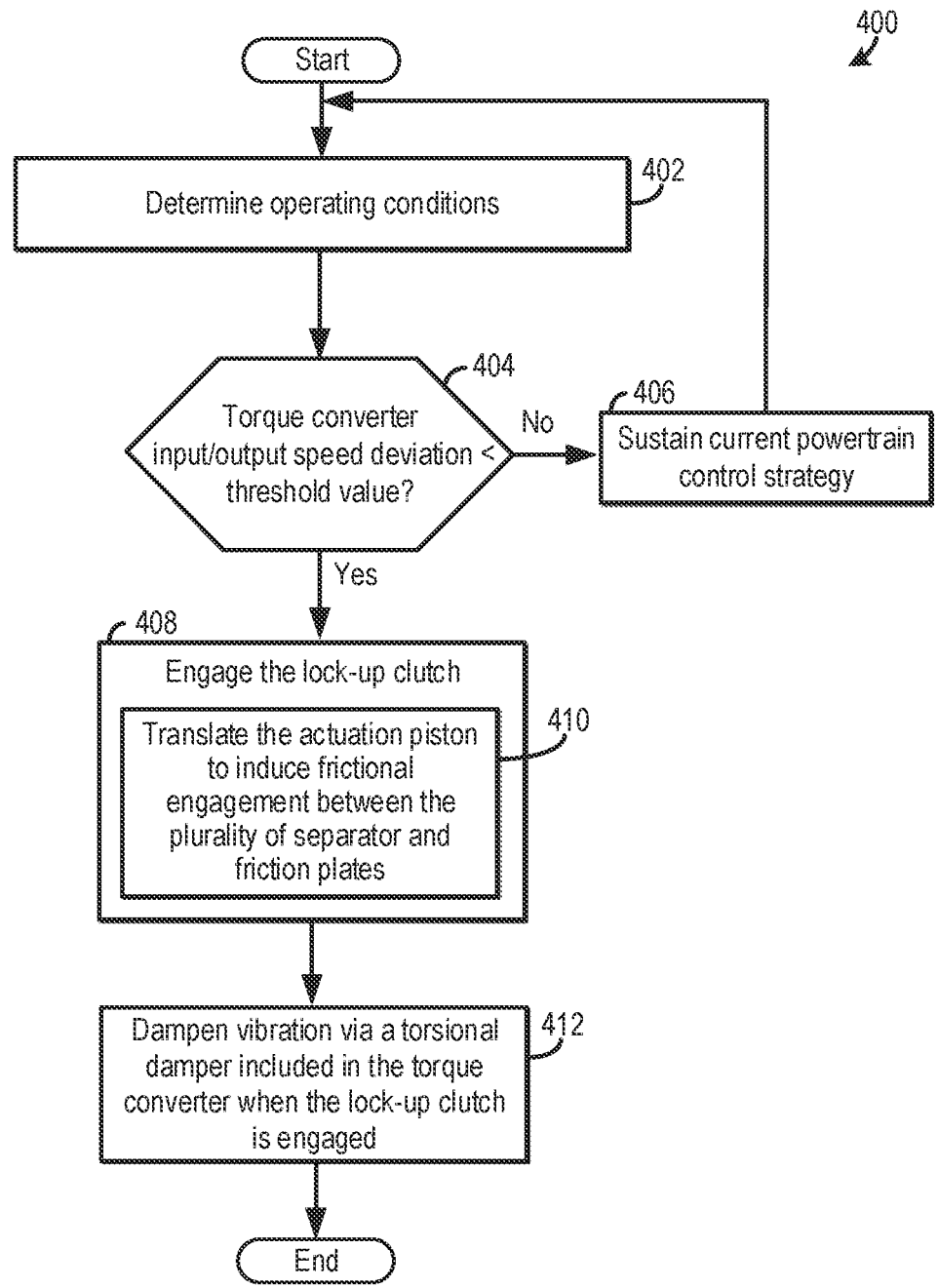
FIG. 4 depicts an operating method for a lock-up clutch in a hydraulic torque converter.

FIG. 4 shows a method 400 for operation of a torque converter. The method 400 may be carried out by any of the torque converters and associated powertrain components, described above with regard to FIGS. 1-3 and 5, in one example. However, in other examples, the method 400 may be implemented using other suitable torque converters.

Further, the method may be carried out as instructions stored in non-transitory memory executed by a processor in a controller. As such, performing the method steps may include sending and/or receiving commands which trigger adjustment of associate components, as previously indicated.

At 402, the method includes determining operating conditions. The operating conditions may include engine speed, transmission speed, the torque converter's input-output speed variance, lock-up clutch position, ambient temperature, and the like. These operating conditions may be determined using sensor data and/or modeling algorithms.

At 404, the method judges if the torque converter's input to output speed deviation is less than a threshold value and if the lock-up clutch is disengaged. The threshold value may be calculated taking into account the torque converters torque multiplication capabilities. For instance, the threshold value may be correlated to a point at which the converter's torque multiplication functionality is negligible (e.g., substantially stops).

If the torque converter's input-output speed variance is not less than the threshold value or the lock-up clutch is engaged (NO at 404), the method moves to 406. At 406, the method includes sustaining the current powertrain control strategy. For instance, the lock-up clutch may be sustained in a disengaged or engaged configuration and the current transmission gear ratio may be sustained.

Conversely, if the torque converter's input-output speed variance is less than the threshold value and the lock-up clutch is disengaged (YES at 404), the method moves to 408. At 408, the method includes engaging the lock-up clutch. Engagement of the lock-up clutch may include sending a control signal to a hydraulic valve to hydraulically initiate clutch engagement. Alternatively, the lock-up clutch may be directly electronically actuated via a solenoid, for instance. Engaging the lock-up clutch may specifically include step 410. At 410, the method includes translating the actuation piston to induce frictional engagement between the plurality of separator and friction plates. As the piston translates, the dampening spring attenuates shocks, thereby enhancing shift quality. Specifically, the engagement spring reduces the sensitivity of clutch filling.

Next at 412, the method includes dampening vibration via a torsional damper included in the torque converter while the lock-up clutch is engaged. By incorporating the damper in the torque converter, vibrations from the engine may be damped using a compact arrangement. Consequently, NVH in the powertrain is reduced. Method 400 therefore allows transmission torque adjustments to be smoothly and efficiently carried out.

The technical effect of the torque converter operating methods described herein is to enhance shift quality by reducing NVH. Further, the torque converter operating methods described herein reduce losses in the torque converter when the input to output speed variance in the torque converter drops below a threshold value.

FIGS. 1-3 and 5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a torque converter is provided that comprises a first attachment interface designed to rotationally couple to a prime mover; a second attachment interface designed to rotationally couple to a transmission; and a lock-up clutch including: an engagement spring embedded in an actuation piston; a plurality of separator plates supported by one or more guiding pins that extend through the plurality of separator plates and into a casing; and a plurality of friction plates interleaved with the plurality of separator plates; wherein the plurality of separator plates and friction plates are axially captured between the actuation piston and an end plate.

In another aspect, a method for operation of a torque converter is provided that comprises: selectively engaging a lock-up clutch in the torque converter, wherein the torque converter includes: two opposing rotational interfaces coupled to an engine and a transmission; the lock-up clutch comprising: an engagement spring embedded in an actuation piston; a plurality of separator plates supported by one or more guiding pins that extend through the plurality of separator plates and into an end plate and a casing; and a plurality of friction plates interleaved with the plurality of separator plates; wherein the plurality of separator plates and friction plates are axially captured between the actuation piston and the end plate. In one example, the method may further comprise dampening vibration via a torsional damper included in the torque converter when the lock-up clutch is engaged.

In yet another aspect, a torque converter is provided that comprises a first attachment interface designed to rotationally couple to a flexplate or flywheel of an engine; a second attachment interface designed to rotationally couple to a transmission; a lock-up clutch including: an engagement spring embedded in an actuation piston; a plurality of separator plates supported in a housing by one or more guiding pins that extend through the plurality of separator plates, an end plate, and into a casing and an end plate; and a plurality of friction plates interleaved with the plurality of separator plates; wherein the plurality of separator plates and friction plates are axially captured between the actuation piston and the end plate.

In any of the aspects or combinations of the aspects, the engagement spring may be positioned radially inward from the one or more guiding pins and wherein radial ends of the plurality of separator plates are spaced away from an interior surface of the casing.

In any of the aspects or combinations of the aspects, the torque converter may comprise torsional damper configured to dampen vibration and wherein the lock-up clutch is a hydraulically actuated wet clutch.

In any of the aspects or combinations of the aspects, the transmission may be a powersplit transmission, a powershift transmission, or a hydrostatic transmission.

In any of the aspects or combinations of the aspects, the engagement spring may be a wave spring or a disc spring.

In any of the aspects or combinations of the aspects, selectively engaging the lock-up clutch, may include engaging the lock-up clutch when a speed variance between the two opposing rotational interfaces is smaller than a threshold value.

In any of the aspects or combinations of the aspects, engaging the lock-up clutch may include moving the actuation piston to induce frictional engagement between the plurality of separator plates and friction plates and wherein the plurality of separator plates may axial travel along the one or more guiding pins during lock-up clutch engagement.

In any of the aspects or combinations of the aspects, during lock-up clutch engagement, the engagement spring may attenuate shocks.

In any of the aspects or combinations of the aspects, during lock-up clutch engagement, the engagement spring may reduce the sensitivity of the clutch filling In any of the aspects or combinations of the aspects, the plurality of separator plates may include outer radial ends that are spaced away from an inner surface of the casing and do not include splines that mate with the casing.

In any of the aspects or combinations of the aspects, the one or more guiding pins may each extend axially through a corresponding opening in one of the plurality of clutch separator plates and into a recess in a section of the casing.

In any of the aspects or combinations of the aspects, the engagement spring may be positioned radially inward from the one or more guiding pins.

In any of the aspects or combinations of the aspects, radial ends of the plurality of separator plates may be spaced away from an interior surface of the casing.

In any of the aspects or combinations of the aspects, the plurality of separator plates may not include splines that attach the casing to the plurality of separator plates.

In any of the aspects or combinations of the aspects, the engagement spring may be a wave spring.

In any of the aspects or combinations of the aspects, the engagement spring may be a disc spring.

In any of the aspects or combinations of the aspects, the torque converter may further comprise a torsional damper positioned radially between the actuation piston and a central shaft.

In any of the aspects or combinations of the aspects, the torque converter may further comprise a torsional damper positioned radially between the friction plate hub and a central shaft.

In any of the aspects or combinations of the aspects, the prime mover may be an electric motor.

In another representation, an automatic transmission with a hydraulic torque converter is provided that comprises a locking clutch with a plurality of guiding rods that extend through a plurality of friction plates and into a casing and an end plate, wherein the locking clutch includes a spring positioned in a recess in a piston and contacting one of the plurality of friction plates.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. As such, while various embodiments have been described above, it should be understood that they have been presented by way of example, and not limitation and the embodiments described above are therefore to be considered in all respects as illustrative, not restrictive. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein. As such, persons skilled in the relevant arts that the disclosed subject matter may be embodied in other specific forms without departing from the spirit of the subject matter.

As used herein, the terms "approximately" and "substantially" are construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related

The invention claimed is:

1. A torque converter, comprising:
   a first attachment interface rotationally coupled to an input shaft and designed to rotationally couple to a prime mover;
   an impeller rotationally coupled to the input shaft;
   a second attachment interface designed to rotationally couple to a transmission; and
   a lock-up clutch including:
      an engagement spring embedded in an actuation piston, wherein an opening in the actuation piston circumferentially surrounds the engagement spring;
      a seal circumferentially surrounding the actuation piston and sealing pressurized fluid in a cavity of a lock-up hub;
      a plurality of separator plates supported by one or more guiding pins that extend through the plurality of separator plates and into a casing; and
      a plurality of friction plates interleaved with the plurality of separator plates;
      wherein the plurality of separator plates and the plurality of friction plates are axially captured between the actuation piston and an end plate; and
      wherein the end plate is spaced away from a radially outer interior surface of the casing.

2. The torque converter of claim 1, wherein the one or more guiding pins each extend axially through a corresponding opening in the plurality of separator plates and into a recess in a section of the casing.

3. The torque converter of claim 1, wherein the engagement spring is positioned radially inward from the one or more guiding pins.

4. The torque converter of claim 1, wherein radial ends of the plurality of separator plates are spaced away from the radially outer interior surface of the casing.

5. The torque converter of claim 4, wherein the plurality of separator plates do not include splines that attach the casing to the plurality of separator plates.

6. The torque converter of claim 1, wherein the engagement spring is a wave spring.

7. The torque converter of claim 1, wherein the engagement spring is a disc spring.

8. The torque converter of claim 1, further comprising a torsional damper positioned radially between the lock-up hub and a central shaft.

9. The torque converter of claim 1, wherein the prime mover is an electric motor.

10. A method for operation of a torque converter, comprising:
    selectively engaging a lock-up clutch in the torque converter, wherein the torque converter includes:
       an input shaft rotationally coupled to an engine;
       an output shaft coupled to a transmission;
       an impeller rotationally coupled to the input shaft; and
       a turbine rotationally coupled to the output shaft;
       the lock-up clutch comprising:
          an engagement spring embedded in an actuation piston;
          a seal circumferentially surrounding the actuation piston and sealing pressurized fluid in a cavity of a lock-up hub;
          a plurality of separator plates supported by one or more guiding pins that extend through the plurality of separator plates and into an end plate and a casing; and
          a plurality of friction plates interleaved with the plurality of separator plates;
          wherein the plurality of separator plates and the plurality of friction plates are axially captured between the actuation piston and the end plate;
          wherein an opening in the actuation piston circumferentially surrounds the engagement spring; and
          wherein the end plate is spaced away from a radially outer interior surface of the casing.

11. The method of claim 10, wherein selectively engaging the lock-up clutch, includes engaging the lock-up clutch when a speed variance between the input shaft and the output shaft is smaller than a threshold value.

12. The method of claim 11, wherein engaging the lock-up clutch includes moving the actuation piston to induce frictional engagement between the plurality of separator plates and friction plates and wherein the plurality of separator plates axial travel along the one or more guiding pins during lock-up clutch engagement.

13. The method of claim 11, wherein during lock-up clutch engagement, the engagement spring reduces a sensitivity of a lock-up clutch filling.

14. The method of claim 11, further comprising dampening vibration via a torsional damper included in the torque converter when the lock-up clutch is engaged.

15. The method of claim 10, wherein the plurality of separator plates include outer radial ends that are spaced away from the radially outer interior surface of the casing and do not include splines that mate with the casing.

16. A torque converter, comprising:
    an input attachment interface rotationally coupled to an input shaft and designed to rotationally couple to a flexplate or flywheel of an engine;
    an output attachment interface rotationally coupled to an output shaft and designed to rotationally couple to a transmission;
    a turbine rotationally coupled to the output shaft;
    a lock-up clutch including:
       an engagement spring embedded in an actuation piston;
       a seal circumferentially surrounding the actuation piston and sealing pressurized fluid in a cavity of a lock-up hub;
       a plurality of separator plates supported in a housing by one or more guiding pins that extend through the plurality of separator plates and into a casing and an end plate; and
       a plurality of friction plates interleaved with the plurality of separator plates;
       wherein the plurality of separator plates and the plurality of friction plates are axially captured between the actuation piston and the end plate;
       wherein an opening in the actuation piston circumferentially surrounds the engagement spring; and
       wherein the end plate is spaced away from a radially outer interior surface of the casing.

17. The torque converter of claim 16, wherein the engagement spring is positioned radially inward from the one or more guiding pins and wherein radial ends of the plurality of separator plates are spaced away from the radially outer interior surface of the casing.

18. The torque converter of claim 16, further comprising a torsional damper configured to dampen vibration and wherein the lock-up clutch is a hydraulically actuated wet clutch.

19. The torque converter of claim 16, wherein the transmission is a powersplit transmission, a powershift transmission, or a hydrostatic transmission.

20. The torque converter of claim 16, wherein the engagement spring is a wave spring or a disc spring.

* * * * *